Oct. 16, 1951 J. G. INGRES 2,571,885
TRACTOR-TRAILER BRAKE SYSTEM
Filed March 22, 1946 3 Sheets-Sheet 2

Inventor
JEANNOT G. INGRES
By C. L. Parker
Attorney

Patented Oct. 16, 1951

2,571,885

UNITED STATES PATENT OFFICE 2,571,885

TRACTOR-TRAILER BRAKE SYSTEM

Jeannot G. Ingres, Richmond, Va., assignor to Empire Electric Brake Company, Newark, N. J., a corporation of New Jersey Application March 22, 1946, Serial No. 656,363

21 Claims. (Cl. 188—3)

This invention relates to tractor-trailer brake mechanisms.

It is the common practice with tractor-trailer brake systems to provide a power operated device for applying the tractor brakes, such power means usually being in the form of a differential pressure fluid operated motor. Such motor is controlled by a valve mechanism operable by the brake pedal to establish differential pressures in the motor when the brake pedal is depressed. The brake-applying motors of the trailer are controlled in accordance with differential pressures in the brake-applying motor of the tractor, and this is accomplished through a pipe line leading from the brake-applying motor of the tractor to what is known as a "conversion valve" on the tractor, such valve thereby being rendered operative to supply power to the trailer-brake motors when the tractor brake applying motor is energized.

In view of the substantial size of present day tractor-trailer combinations, the pipe line leading to the conversion valve is of extreme length, frequently being as long as thirty feet. Because of this fact, there is a substantial time lag involved between energization of the tractor brake operating motor and the conversion valve. The tractor brakes accordingly are applied ahead of the trailer brakes, thus creating a dangerous condition frequently resulting in "jack-knifing." This is particularly dangerous on slippery highways.

Because of the demand of the drivers of such vehicles, it is the common practice to provide for hand operation of the trailer brakes so that an operator can apply or at least "snub" the trailer brakes before operating the brake pedal, thus assuring operation of the trailer brakes ahead of the truck brakes. While the provision of the hand operated means is advantageous from a safety standpoint, it possesses definite disadvantages. For example, most drivers when substantially less than a maximum braking action is desired, will depend solely on the operation of the hand brake means, and the trailer brakes are thus depended upon to decelerate the speed of the relatively heavy tractor-trailer combination. This results in rapid and excessive wear of the trailer brakes, and in an emergency, the operator must think quickly to operate the hand brake ahead of or at least simultaneously with brake pedal operation.

An important object of the present invention is to provide a novel system wherein the hand operated means is eliminated, and wherein the system provides novel means for assuring application of the trailer brakes prior to, or at least simultaneously with the application of the tractor brakes.

A further object is to provide a novel system of the character referred to wherein the conversion valve is initially subject to control by a special valve device which becomes operative upon initial depression of the brake pedal, the special valve device being connected to the power device for the tractor brakes whereby its operation is taken over by such power device when the differential pressures built up therein have had the necessary time to affect the pressures in the special valve device.

A further object is to provide such a special valve device in the nature of a mechanism which is electrically-operated upon initial depression of the brake pedal to immediately connect the conversion valve to the source of differential pressure to thereby eliminate any lag in the operation of the trailer brakes, and to provide fluid pressure operative means in the auxiliary valve subject to fluid pressures established in the brake-applying motor of the tractor to render the conversion valve subject to pressures in such brake motor when such pressures have had time to control the auxiliary valve mechanism.

A further object is to provide such an auxiliary valve mechanism which is of such nature as to be instantaneously responsive to operation of the brake pedal to cause the conversion valve to energize the trailer brake motors, but only to a predetermined limited extent to provide a "snubbing" action in the trailer brakes, the conversion valve, after the time interval necessary for such operation, being then subjected to differential pressures in the tractor brake applying motor whereby the trailer brakes will be energized proportionately to the energization of the motor for applying the tractor brakes.

A further object is to provide a system of the character referred to wherein the auxiliary valve device is subject to initial operation by electrical means, and to provide means for rendering the electrical means inoperative after a time interval necessary for differential pressures in the tractor brake applying motor to affect the auxiliary valve, and to provide means for rendering the electrical means inoperative during the releasing of the brake-pedal, thus preventing the electrical means from reasserting its control over the conversion valve when the brake-pedal is released.

Other objects and advantages of the invention will become apparent during the course of the following description.

In the drawings I have shown one embodiment of the invention. In this showing—

Figures 1, 6:
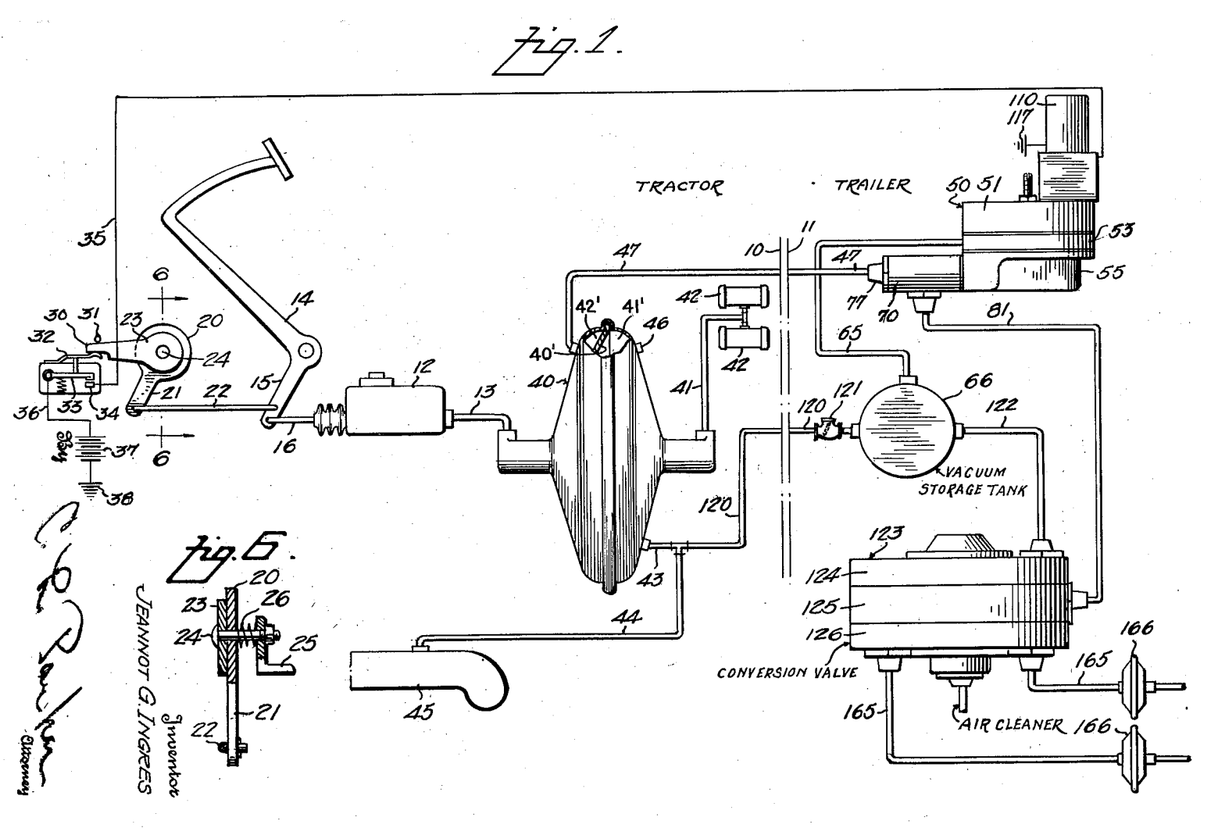
Figure 1 is a schematic view of the entire brake system.
Figure 6 is a detailed sectional view on line 6—6 of Figure 1.

Referring to Figure 1, the ssytem has been illustrated with all of the essential parts necessary for the tractor and trailer, the mechanism to the left of the broken line 10 indicating the tractor parts, and the parts to the right of the broken line 11 indicating the trailer parts of the system. The tractor brake mechanism comprises a conventional master cylinder 12 having the usual piston (not shown) for displacing brake fluid through an outlet pipe 13 upon operation of a conventional brake pedal 14, this pedal having a lower arm 15 provided with a rod 16 having the usual mechanical connection with the piston of the master cylinder.

A switch mechanism is controlled by the brake-pedal 14. This mechanism comprises a disk 20 having a depending arm 21, and a rod 22 connects the arm 21 to the arm 15. A second disk 23 overlies the disk 20 in contact therewith and is pivotally connected thereto by a bolt or other pivot pin 24. This bolt extends through any suitable support, such as a bracket 25, and a spring 26 is interposed between the bracket 25 and disk 20 to exert resilient pressure tending to hold the disks in frictional engagement with each other. In the absence of any resisting forces on the disk 23, therefore, this disk will turned with the disk 20 when the latter is rotated upon operation of the brake pedal.

The disk 23 is provided with a radially extending arm 30 normally engaging a stop pin 31. The end of the arm 30 also engages a leaf spring 32 connected to a switch arm 33 movable into engagement with a contact 34. This contact is connected to a wire 35 to be referred to later. The switch arm 33 is connected by a wire 36 to a source of current 37 grounded as at 38.

The outlet pipe 13 of the master cylinder is connected to a brake booster mechanism indicated as a whole by the numeral 40. This booster mechanism may be of any desired type which is responsive to pressures generated in the master cylinder 12 to supply brake fluid through an outlet pipe 41 leading to the tractor wheel cylinders generally indicated by the numeral 42. The motor of the booster mechanism 40 is preferably of the type shown in the patent to R. J. Klimkiewicz, No. 2,377,699, granted June 5, 1945. Such a booster mechanism employs a pressure responsive member in the form of a diaphragm 40' for assisting the operator in generating braking pressures in the tractor brake cylinders. The diaphragm 40¹ divides the motor 40 to form constant and variable pressure chambers 41¹ and 42¹ respectively. The chamber 41¹ of the booster 40 is tapped by a pipe 43 leading as at 44 to the intake manifold 45 of the vehicle engine. An atmospheric connection 46 is adapted to supply atmospheric pressure to the opposite chamber 42' of the booster 40 under brake-operating conditions, and a pipe 47 is tapped into the variable pressure chamber 42' of the booster 40 to render the trailer-brake mechanism, to be described, subject to operation in accordance with differential pressures in the motor 40.

Figure 2:
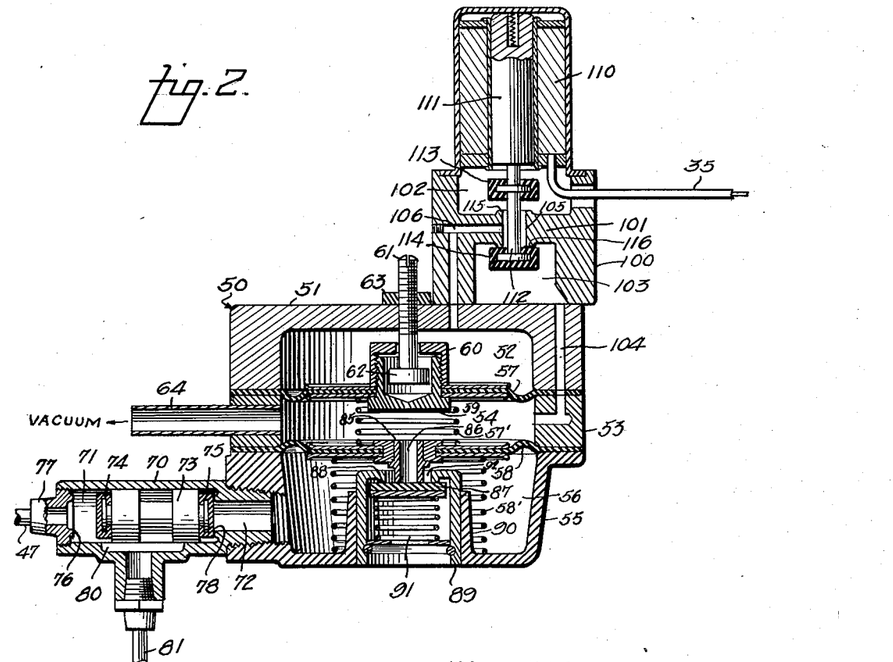
Figure 2 is a central vertical sectional view through the auxiliary valve mechanism looking in the same direction with respect to this mechanism as in Figure 1, the parts of the mechanism being shown in certain positions.
Figure 3:
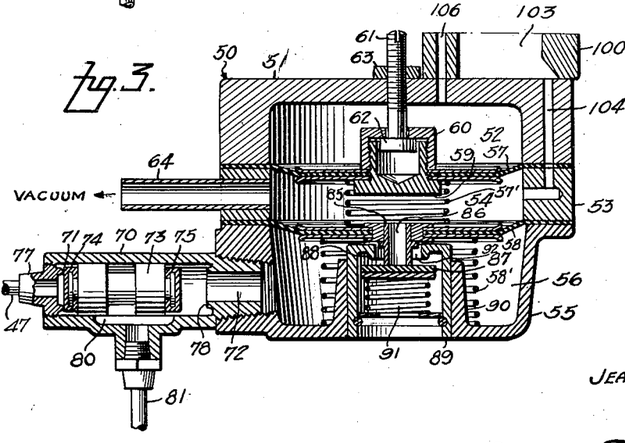
Figure 3 is a fragmentary sectional view showing the lower portion of the auxiliary valve mechanism, certain of the parts being shown in different positions.
Figure 4:
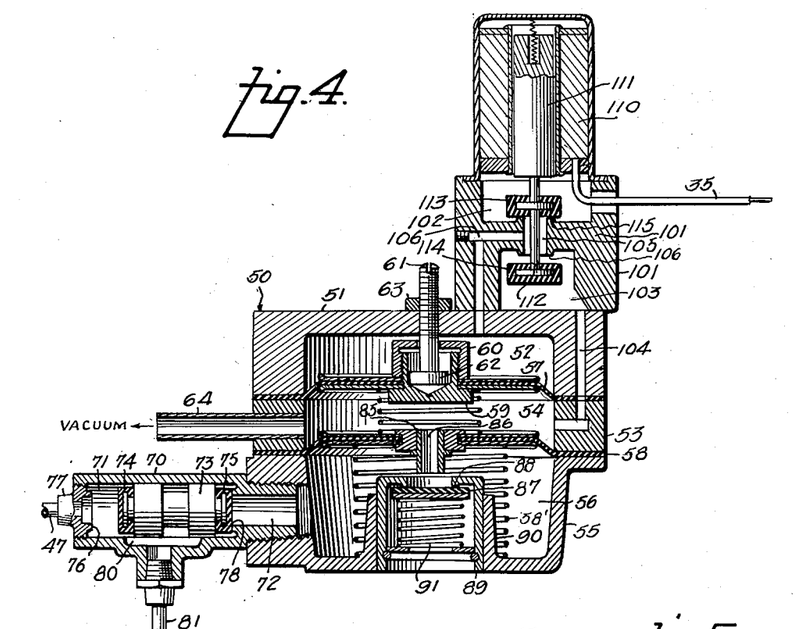
Figure 4 is a sectional view similar to Figure 2 showing the parts in still different positions.

The pipe 47 is connected in a manner to be described to an auxiliary valve mechanism shown in detail in Figures 2, 3 and 4 and indicated as a whole by the numeral 50. The auxiliary valve mechanism comprises an upper casing member 51 having a chamber 52 therein, an intermediate casing member 53, having a chamber 54 therein defined in a manner to be described, and a lower casing member 55, having a chamber 56 therein.

The casing member 53 has its chamber 54 defined by an upper diaphragm 57, clamped between the members 51 and 53, and a lower diaphragm 58, clamped between the members 53 and 55. A spring 57' is arranged between the diaphragms 57 and 58 and a similar spring 58' is arranged beneath the diaphragm 58 to urge the latter upwardly. The diaphragm 57 carries a thimble 59 capped as at 60, and a screw 61 has a head 62 at its lower end arranged within the thimble 59 and engageable with the bottom of the thimble and with the cap 60 to limit vertical displacement of the diaphragm 57. The screw 61 is threaded through the top of the casing member 51 and the jamb nut 63 is threaded on the screw 61 to hold the latter in adjusted position. The chamber 54 is provided with a nipple 64 for connection with a pipe 65 leading to a vacuum storage tank 66 (Fig. 1) to be referred to later.

A cylinder 70 is connected to the casing member 55 and has its bore 71 communicating with the chamber 56 through a passage 72. A double ended piston 73 is slidable in the bore 71 and the respective ends of the piston 73 are provided with resilient caps 74 and 75, forming valves. The cap 74 is engageable with a seat 76 formed on the inner end of a union 77 to which the pipe 47 (Fig. 1) is connected. The cap 75 is normally engageable with a seat 78 formed at the end of the passage 72.

A groove 80 is formed in the cylinder 70 and is of a length preferably slightly less than the length of the piston 73 exclusive of the caps 74 and 75. The groove 80 is normally in communication with the left hand end of the bore 71 as shown in Figure 4, and when the valve 73 is shifted in a manner to be described to the position shown in Figure 3, the groove 80 communicates with the right hand end of the bore 71, and consequently with the chamber 56 through the passage 72. The groove 80 is in communication with one end of a pipe 81 leading to the conversion valve to be described later.

The diaphragm 58 carries a thimble 85 having a passage 86 therethrough in fixed communication with the chamber 54. Under conditions to be described, the lower end of the thimble 85 engages a disk 87, thus closing the lower end of the passage 86. The disk 87 is a valve which normally engages a seat 88 formed on a thimble 89 driven into an upwardly extending integral cylinder 90 carried by the casing 55. The valve 87 is urged upwardly towards its seat by a spring 91. Within the seat 88, the thimble 89 is provided with an opening 92 of greater diameter than the thimble 85 so that when such thimble unseats the valve 87, as shown in Figure 3, air can flow through the thimble 89 and into the chamber 56 for purposes to be described. When the thimble 85 is raised, as shown in Figure 4, the chambers 54 and 56 will be in communication with each other.

The valve body 100 is seated upon the top of the casing member 51 and is secured thereto in any suitable manner. The valve body 100 is provided with a partition 101 dividing it into chambers 102 and 103, the latter of which is in fixed communication with the chamber 54 through a continuous passage 104 formed in the member 51, diaphragm 57 and member 53. The partition 101 is provided with an opening 105 therethrough and this opening is in fixed communication through a passage 106 with the chamber 52.

A solenoid 110 is mounted above the valve body 100 and is provided with an armature 111 carrying a downwardly projecting stem 112 on which are mounted spaced valves 113 and 114 respectively engageable with seats 115 and 116 formed at the ends of the passage 105. The stem 112 is smaller in diameter than the opening 105 and the valves 113 and 114 are spaced apart a distance greater than the space between the valve seats 115 and 116. Accordingly, one or the other of the chambers 102 or 103 will always be in communication with the chamber 52. The wire 35 previously described is connected to one end of the winding of the solenoid 110, and the other end of this winding is grounded as at 117 (Fig. 1).

The vacuum storage tank 66 is connected by a pipe 120 with the pipe 44, and a check valve 121 is interposed in the pipe 120. Accordingly it will be apparent that the tank 66 is maintained in an evacuated condition to provide a source of vacuum for the trailer parts of the apparatus. The chamber 54 is in constant communication with the tank 66 through pipe 65 and accordingly vacuum is always present in such chamber. The tank 66 is also connected through a pipe 122 with a conversion valve indicated as a whole by the numeral 123 and illustrated in detail in Figure 5. The body of the conversion valve is made up of three parts, 124, 125 and 126. Between the sections 124 and 125 is clamped a diaphragm 127, and a similar diaphragm 128 is clamped between the sections 125 and 126.

Figure 5:
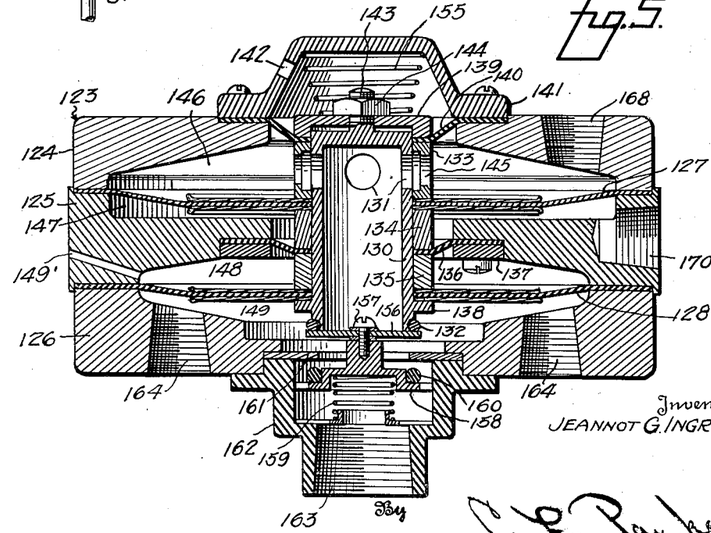
Figure 5 is the central axial sectional view through a conversion valve.

A sleeve 130 is arranged axially within the conversion valve and is provided with radial ports 131. The lower end of the sleeve 130 carries a rubber or similar valve seat 132 for a purpose to be described.

A pair of short sleeve sections 133 and 134 surround the sleeve 130 and receive the inner periphery of the diaphragm 127 therebetween. Another short sleeve section 135 surrounds the sleeve 130 and the sleeve sections 134 and 135 receive therebetween the inner periphery of a diaphragm 136, the radially outer portion of which is fixed with respect to the housing section 125 by a ring 137. The diaphragm 128 seats against the sleeve section 135 and against a lower flange 138 formed integrally with the sleeve 130. Adjacent the upper end of the sleeve 130 is arranged a cap 139 and between this cap and the sleeve section 133 is clamped the periphery of a diaphragm 140. The radially outer portion of the diaphragm 140 is clamped to the top of the housing section 124 by a cap 141 vented to the atmosphere as at 142. The sleeve 130 carries at its upper end a threaded stem 143 projecting through the cap 139 and provided with a nut 144, the tightening of which draws together the various elements which co-operate to clamp the inner edges of the four diaphragms shown in Figure 5.

The sleeve section 133 is provided with ports 145 affording communication between the ports 131 and a chamber 146 formed within the housing section 124. The diaphragm 127 divides the chamber 146 from a chamber 147 formed in the upper face of the housing section 125. The latter housing section is provided in its lower face with a chamber 148 vented to the atmosphere as at 149'. The diaphragm 128 divides the chamber 148 from a chamber 149 formed in the top face of the housing section 126.

It will become apparent that certain pressure changes take place in the chambered conversion valve 123, and these changes and their effects are under the control of the auxiliary valve 50 and the differential pressures present in the motor of the booster mechanism 40, as will be described. The sleeve structure and the inner peripheral portions of the diaphragms in Figure 5 are urged downwardly by a spring 155, thus tending to maintain the seat 132 in contact with a valve disk 156 secured as at 157 to a spider 158. This spider is urged upwardly by a spring 159 to tend to engage a rubber valve 160 carried thereby with a stationary valve element 161. The spider 158 is arranged in a cylinder 162 having its lower end internally threaded as at 163 for connection with a suitable air cleaner. It will be obvious that the interior of the cylinder 162 is in constant communication with the atmosphere, and when the valve 160 is opened, air is admitted to the chamber 149. The latter chamber is provided with a pair of ports 164 for connection with pipes 165 (Fig. 1) leading to the respective brake operating motors 166 which operate the trailer brakes (not shown).

The chamber 146 (Fig. 5) is provided with a port 168 to which the pipe 122 (Fig. 1) is connected, and accordingly vacuum is always present in the chamber 146. Since this chamber is in communication with the interior of the sleeve 130, the space in such sleeve is likewise in constant communication with the vacuum source 66. Whether vacuum or air is present in the chamber 149 which is connected to the brake motors 166 depends upon the relative positions of the valves 156 and 160.

The chamber 147 is ported as at 170 for connection with the pipe 81 (Fig. 1) and accordingly the chamber 147 is subjected to differential pressures as determined by the operation of the auxiliary valve 50 as will be described.

The operation of the apparatus is as follows:

The various parts of the apparatus are arranged as shown in Figures 1, 4 and 5. It is assumed that the motor of the tractor-brake-booster mechanism 40 is of the vacuum suspended type, and with the brake pedal released, equal pressures will exist in opposite sides of such motor and the brakes of the tractor will be released. Since this fact is controlling in the operation of the conversion valve 123, as will become apparent later, the trailer brakes are also released.

Assuming that the operator desires to apply the brakes, he will operate the brake pedal 14 in the usual manner. The brake pedal will start to turn in a counterclockwise direction and will impart similar movement to the disk 20. This disk, being held in frictional contact with the disk 23 will impart movement to the latter to move the arm 32 and close the switch arm 33. It will be obvious from the simple circuit shown in Figure 1, therefore, that the first increment of movement of the brake pedal will energize the solenoid 110 to move the armature 111 upwardly. This operation moves valve 114 to closed position and opens the valve 113. In the normal positions of the valves 113 and 114, the former will have been closed and the latter opened, and accordingly the chambers 52 and 54 will have been in communication with each other through passages 104, 105 and 106. Pressures will have been thus balanced in the chambers 52 and 54, vacuum existing in both chambers. The closing of the valve 114 disconnects the chamber 52 from the chamber 54, and the opening of the valve 113 connects the chamber 52 to the atmosphere through the passages 106 and 105, and the chamber 102 which is in constant communication with the atmosphere through the space around the wire 35.

Air will immediately flow into the chamber 52, thus creating differential pressures on opposite sides of the diaphragm 57 to move the latter downwardly. This action builds up pressure through the spring 57' to exert a downward force on the diaphragm 58. This pressure will move the diaphragm 58 downwardly from the position shown in Figure 4 to the position shown in Figure 2 at which point the lower end of the thimble 85 engages the valve 87. At this point, communication between the chambers 54 and 56 will be cut off.

The differential pressures affecting the diaphragm 57 will be sufficient to overcome the resistances of the springs acting upwardly on the diaphragm 58 and valve 87 and accordingly the thimble 85 will effect the opening movement of the valve 87 to the position shown in Figure 3. Under such conditions the chamber 56 will be open to the atmosphere, and air will rush into the chamber 56 and through passage 72, and the air pressure thus created will act against the valve 75 to open it. Thereafter, the air pressure acts on the entire adjacent effective end area of the piston 73 to shift the latter to the left until it assumes the position shown in Figure 3. At this time, the valve 74 will engage the seat 76, and as shown in Figure 3, the pipe 81 will communicate with the passage 72. Air will thereupon flow through the pipe 81 into the conversion valve chamber 147 (Fig. 5).

As previously stated, the motor of the booster mechanism 40 is of the vacuum-suspended type and with the piston 73 normally occupying the position shown in Figure 4, the chamber 147 will have been evacuated. The chamber 146 being in fixed communication with the vacuum source through pipe 122, pressures are normally balanced on opposite sides of the diaphragm 127. Pressures are also normally balanced on opposite sides of the diaphragm 128, the chamber 148 communicating with the atmosphere through port 149' and the chamber 149 communicating with the atmosphere through the open valve 160. Accordingly, when air is admitted to the chamber 147 due to the shifting of the valve 73, pressures on opposite sides of the diaphragm 127 will be unbalanced and the diaphragm, together with the elements connected thereto, will move upwardly.

The sleeve 130, being movable with the diaphragm 127, will move upwardly and the spring 159 will urge the spider 158 upwardly in a similar movement. When the valve 160 engages the seat 161, the chamber 149 will be disconnected from the atmosphere, and the spider 158 will be fixed against further upward movement. However, the sleeve 130 will move upwardly to a further extent, thus disengaging the valve and seat elements 156 and 132 to connect the chamber 149 to the source of vacuum through the sleeve 130, ports 131 and 145, chamber 146 and pipe 122 (Fig. 1). Accordingly, air will be exhausted from the trailer brake motors 166 to apply the trailer brakes.

The operation of the auxiliary valve 50 is such as to effect a limited application of the trailer brakes to provide only a snubbing action and not a full brake application. As is true in all constructions of this character, the conversion valve 123 is in the nature of a pressure-regulating valve and the drop in pressure in the chamber 149 and in the trailer motors 166 will depend upon the differential pressures which are effective for moving the parts from normal positions, in the present case, the pressures affecting the diaphragm 127. The latter diaphragm, in turn, is wholly dependent upon the air pressure released for movement to the conversion valve by the auxiliary valve mechanism 50. In actual practice, it has been found desirable to admit pressure into the pipe 81 and into the chamber 147 to the extent of approximately two pounds per square inch. For this reason, the auxiliary valve 50 also operates in the nature of a pressure-regulating valve.

Referring to Figures 2, 3 and 4, it was previously pointed out that balanced subatmospheric pressures normally exist on opposite sides of the diaphragm 57. These pressures are unbalanced by the opening of the valve 113 to admit full atmospheric pressure into the chamber 62. The differential pressures thus tending to urge the diaphragm 57 downwardly are opposed by the several upwardly acting springs associated with the diaphragms 57 and 58, and the valve 87. The spring pressures are so designed by preference that when the pressure in the chamber 56 reaches approximately two pounds per square inch, the upwardly acting spring forces supplemented by the air pressure in the chamber 56 will be sufficient to move the diaphragm 58 upwardly from the position shown in Figure 3 to the position shown in Figure 2, at which point the air-admission valve 87 will close. Accordingly there will be no further admission of air into the conversion valve chamber 147 (Fig. 5) and thus the exhausting of air from the tractor-brake motors 166 (Fig. 1) will be limited to provide the desired snubbing action.

Any tendency for the pressure in the chamber 56 to drop will render the relatively high pressure in chamber 52 effective for "cracking" valve 87 to admit more air into the chamber 57. Any tendency for the pressure in the chamber 56 to increase will result in an increased upwardly acting pressure on the diaphragm 58 to unseat the lower end of the thimble 85 from the valve 87 to exhaust air from the chamber 56 into the chamber 54. Accordingly the pressure in the chamber 56, under the operative condition being considered, may be predetermined in accordance with the loading of the various springs in Figures 2, 3 and 4.

While the foregoing operations require a substantially lengthy description, it will be apparent that they are substantially instantaneous in operation. Both the vacuum source 66 and the auxiliary valve 50 are in close proximity to the conversion valve 123 and accordingly there is no appreciable time lag present in the variations in the differential pressures occurring in the chambers of the valve mechanisms 50 and 123 when the brake pedal is operated. The solenoid 110 being operated upon initial movement of the brake pedal 14, the movement of the valves 113 and 114 will occur instantaneously with the first increment of movement of the brake pedal. Such movement, therefore, results in substantially instantaneous limited application of the trailer brakes.

The movement of the brake pedal operates the master cylinder 12 in the usual manner to displace fluid therefrom through pipe 13 into the booster mechanism 40. The displaced fluid operates the valve mechanism of the booster motor as fully disclosed in the Klimkiewicz Patent, 2,377,699, referred to above, and brake fluid will be displaced by the effort of the operator and by the action of the booster 40 through pipe 41 to actuate the brake cylinders 42. Thus the tractor brakes will be applied in accordance with the operation described in the Klimkiewicz patent referred to. However, since it is the first increment of movement of the brake pedal which energizes the trailer-brake motors 166, the application of the tractor brakes ordinarily will occur subsequent to the application of the trailer brakes. It is conceivable that in an extremely rapid emergency operation of the brake pedal, the tractor brakes can be applied substantially simultaneously with the trailer brakes, but the trailer brakes are operated so nearly instantaneously upon initial movement of the brake pedal that it is impossible to effect tractor-brake operation prior to trailer-brake operation. Accordingly the present system prevents the inherent dangers of conventional tractor-trailer brake systems in which an appreciable time lag occurs in the operation of the trailer brakes after the tractor brakes have been applied. Thus "jack knifing" is positively prevented, and it is unnecessary to employ the usual hand operated brake lever with its inherent disadvantages previously referred to.

As previously stated, the initial operation of the brake pedal closes the circuit for the solenoid 110 at the switch 34, and switch 33 cannot move beyond closed position. This also limits turning movement of the arm 23, and beyond a point at which the switch is closed, the disk 20 turns relative to the disk 23 by virtue of the mere frictional engagement of the two disks.

As previously stated, the sudden rush of air into the right hand end of the cylinder bore 71 (Figs. 2, 3 and 4) moves the piston 73 toward the left to close the valve 74. The motor of the booster mechanism 40 being vacuum suspended, vacuum will normally exist in the left hand end of the cylinder 70 and the closing of the valve 74 disconnects the vacuum from the pipe 81 and conversion valve chamber 147. When the booster motor comes into operation, air is admitted into the left side of the booster motor to build up the differential pressures which render the booster effective. Air admitted into the booster will also flow through pipe 47 to the auxiliary valve 50 and after a short time interval due to the length of the pipe 47, the pressure in the left hand end of the cylinder 70 will equal the pressure of the air in the high pressure side of the motor of the booster mechanism. As soon as the pressure in such end of the cylinder 70 exceeds two pounds per square inch, or any other pressure for which auxiliary valve 50 is designed, the piston 73 will be moved to the right back to its normal position shown in Figures 2 and 4. Whereas upon initial operation of the brake pedal the differential pressures operating the trailer brake motors 166 will be predetermined by the pressure in the chamber 56 for which the auxiliary valve is designed, the conversion valve 123 will now become subject to pressures in the higher pressure side of the booster motor. The increased pressures thus established in the chamber 147 will establish lower sub-atmospheric pressures in the chamber 149 and accordingly in the trailer brake motors 166, and the differential pressures in the motors 166 will be exactly proportionate to the differential pressures in the motor of the booster mechanism 40. The conversion valve in Figure 5 functions as will be apparent in this respect, the lowering of the pressure in the chamber 149 increasing the differential pressures between the chambers 148 and 149 to tend to move the diaphragm 128 downwardly. The differential pressures on the diaphragm 128 sufficient to open the air valve 160 will be proportionate to the air pressure present in the chamber 147 tending to oppose this action, and the pressure in the chamber 147, in turn, will depend upon the operation of the booster motor 40 under the control of the operator.

It would seem at first glance that when the brake pedal 14 is released the reestablishment of balanced vacuum conditions in the motor of the booster mechanism 40 would reduce pressure in the left hand end of the cylinder 70 whereby the pressure of two pounds per square inch in the chamber 56 would shift the valve 73 to the left to the position shown in Figure 3. If this operation took place, quite obviously there would remain when the brake pedal is released the same differential pressures in the trailer motors 166 as occurred during initial operation of these motors. However, the present mechanism operates to render the auxiliary valve 50 inoperative once the booster mechanism 40 has taken over the control of the conversion valve 123.

When the brake pedal 14 is released and after any brake application, regardless of how far the brake pedal has been depressed, the first increment of movement of the brake pedal toward inoperative position will result in rocking the disk 23 and arm 30 in a clockwise direction, thus immediately opening the switch 33. This operation occurs before there is any appreciable deenergization of the booster mechanism 40. The opening of the switch 33 deenergizes the solenoid 110, thus restoring the normal positions of the valves 113 and 114, the chamber 52 being closed to the atmosphere and opened to the source of vacuum through passages 106 and 105, chamber 103, passage 104, etc. Thus pressures will be balanced on opposite sides of the diaphragm 57 immediately upon the initial releasing movement of the brake pedal. While the brakes are still in operation, therefore, the parts will be restored to the normal positions shown in Figure 4 and air will be exhausted from the chamber 56 through passage 86, and there will be no pressure in the passage 72 to tend to move the valve piston 73 as the brakes are released. Accordingly the piston 73 will remain in its normal position shown in Figures 2 and 3, which is the position the piston 73 occupies when the brake operation is initiated in the manner previously described.

I claim:

1. In a tractor-trailer brake system, a booster brake mechanism for operating the tractor brakes comprising a fluid pressure operated booster motor and a brake pedal normally occupying an "off" position and movable from such position to effect energization of said motor to apply the tractor brakes, a fluid pressure operated trailer brake applying motor, and conversion valve mechanism for controlling said trailer brake motor, and having a fluid connection with said booster motor to be operated by differential pressures therein to effect energization of said trailer brake applying motor to a degree proportionate to energization of said booster motor, and an auxiliary valve mechanism for operating said conversion valve mechanism to energize said trailer brake applying motor wholly independently of said booster motor and operable upon initial movement of the brake pedal from its "off" position.

2. In a tractor-trailer brake system, a booster brake mechanism for operating the tractor brakes comprising a fluid pressure operated booster motor and a brake pedal normally occupying an "off" position and movable from such position to effect energization of said motor to apply the tractor brakes, a fluid pressure operated trailer brake applying motor, and conversion valve mechanism for controlling said trailer brake motor, and having a fluid connection with said booster motor to be operated by differential pressures therein to effect energization of said trailer brake applying motor to a degree proportionate to energization of said booster motor, an auxiliary valve mechanism including a valve connected in the fluid connection between said booster motor and said conversion valve mechanism, said auxiliary valve mechanism being operable for disconnecting said conversion valve from said booster motor and connecting it to a source of differential pressure to render said trailer brake operating motor operative, and means for rendering said auxiliary valve mechanism operative upon initial operation of the brake pedal from its "off" position.

3. In a tractor-trailer brake system, a booster brake mechanism for operating the tractor brakes comprising a fluid pressure operated booster motor and a brake pedal normally occupying an "off" position and movable from such position to effect energization of said motor to apply the tractor brakes, a fluid pressure operated trailer brake applying motor, and conversion valve mechanism for controlling said trailer brake motor, and having a fluid connection with said booster motor to be operated by differential pressures therein to effect energization of said trailer brake applying motor to a degree proportionate to energization of said booster motor, an auxiliary valve mechanism including a valve connected in the fluid connection between said booster motor and said conversion valve mechanism, said auxiliary valve mechanism being operable for disconnecting said conversion valve from said booster motor and connecting it to a source of differential pressure to render said trailer brake operating motor operative, said auxiliary valve mechanism comprising a solenoid energizable for rendering said auxiliary valve mechanism operative, and a circuit for said solenoid comprising a switch operative by the brake pedal upon initial movement thereof from its "off" position.

4. In a tractor-trailer brake system, a booster brake mechanism for operating the tractor brakes comprising a fluid pressure operated booster motor and a brake pedal normally occupying an "off" position and movable from such position to effect energization of said motor to apply the tractor brakes, a fluid pressure operated trailer brake applying motor, and conversion valve mechanism for controlling said trailer brake motor, and having a fluid connection with said booster motor to be operated by differential pressures therein to effect energization of said trailer brake applying motor to a degree proportionate to energization of said booster motor, an auxiliary valve mechanism including a valve connected in the fluid connection between said booster motor and said conversion valve mechanism, said auxiliary valve mechanism being operable for disconnecting said conversion valve from said booster motor and for rendering it operative for connecting it to a source of differential pressure to render said trailer brake operating motor operative, and means for rendering said auxiliary valve mechanism operative upon initial operation of the brake pedal from its "off" position, said auxiliary valve mechanism further comprising a plurality of diaphragms and pressure chambers, and valve devices operable thereby arranged to control said conversion valve to limit the degree of energization of said trailer brake operating motors.

5. In a tractor-trailer brake system, a booster brake mechanism for operating the tractor brakes comprising a fluid pressure operated booster motor and a brake pedal normally occupying an "off" position and movable from such position to effect energization of said motor to apply the tractor brakes, a fluid pressure operated trailer brake applying motor, and conversion valve mechanism for controlling said trailer brake motor, and having a fluid connection with said booster motor to be operated by differential pressures therein to effect energization of said trailer brake applying motor to a degree proportionate to energization of said booster motor, an auxiliary valve mechanism including a valve connected in the fluid connection between said booster motor and said conversion valve mechanism, said auxiliary valve mechanism being operable for disconnecting said conversion valve from said booster motor and for rendering it operative for connecting it to a source of differential pressure to render said trailer brake operating motor operative, said auxiliary valve mechanism comprising a solenoid energizable for rendering said auxiliary valve mechanism operative, and a circuit for said solenoid comprising a switch operative by the brake pedal upon initial movement thereof from its "off" position, said auxiliary valve mechanism further comprising a plurality of diaphragms and pressure chambers, and valve devices operable thereby arranged to control said conversion valve to limit the degree of energization of said trailer brake operating motors.

6. In a tractor-trailer brake system, a booster mechanism for operating the tractor brakes comprising a differential fluid pressure operated motor and a brake pedal occupying a normal "off" position and connected to said booster motor to effect energization thereof upon movement of the brake pedal from its "off" position, a differential fluid pressure operated trailer brake motor, a conversion valve mechanism controlling communication between said trailer brake motor and a source of pressure differential, a fluid connection between said conversion valve mechanism and said booster motor to render said conversion valve mechanism responsive to energization of said booster motor to connect said trailer brake motor to said source to be energized to a degree proportionate to energization of said booster motor, and an auxiliary valve mechanism including a valve casing connected in said fluid connection, a valve device in said casing, said auxiliary valve mechanism having a chamber connectible with the atmosphere, said valve device normally occupying a position disconnecting said valve casing from said chamber and connecting it to said booster motor and being movable to an operative position disconnecting said valve casing from said booster motor and connecting said chamber to said conversion valve mechanism, when air is admitted to said chamber, to render it operative for effecting energization of said trailer brake operating motor, said valve device being movable from its operative to its normal position when the pressure supplied through said fluid connection from said booster motor exceeds the pressure in said chamber, said auxiliary valve mechanism comprising means therein for limiting the pressure in said chamber, and means responsive to initial operation of the brake pedal from its "off" position for admitting air into said chamber.

7. Apparatus constructed in accordance with claim 6 wherein the means for rendering said auxiliary valve mechanism operative comprises a solenoid, and a circuit for said solenoid including a switch movable to closed position upon initial operation of the brake pedal from its "off" position.

8. Apparatus constructed in accordance with claim 6 wherein the means for rendering said auxiliary valve mechanism operative comprises a solenoid, a circuit therefor including a switch, and a pair of members frictionally engaging each other, one of such members being connected to said switch and the other being connected to the brake pedal.

9. In a tractor-trailer brake system, a booster mechanism for operating the tractor brakes including a pedal and a booster motor operable by air pressure and energizable upon operation of the pedal, a motor for operating the trailer brakes, a conversion valve mechanism for controlling communication between said trailer brake motor and a source of pressure differential, a fluid conduit normally connecting said booster motor to said conversion valve mechanism to render the latter operable upon energization of said booster motor for effecting energization of said trailer brake motor, a valve casing connected in said fluid conduit, a valve in said casing normally occupying a position in which said conduit is opened through said valve casing, and means operative upon initial movement of the brake pedal from its "off" position for shifting said valve to an operative position in which said conversion valve mechanism will be disconnected from said booster motor and will be connected to a source of air pressure to render said conversion valve mechanism operative for effecting energization of said trailer brake motor.

10. In a tractor-trailer brake system, a booster mechanism for operating the tractor brakes including a pedal and a booster motor operable by air pressure and energizable upon operation of the pedal, a motor for operating the trailer brakes, a conversion valve mechanism for controlling communication between said trailer brake motor and a source of pressure differential, a fluid conduit normally connecting said booster motor to said conversion valve mechanism to render the latter operable upon energization of said booster motor for effecting energization of said trailer brake motor, a valve casing connected in said fluid conduit, a valve in said casing normally occupying a position in which said conduit is opened through said valve casing, said valve being shiftable to an operative position by fluid pressure thereagainst in excess of the pressure in said conduit when said booster motor is deenergized, and being operative in such position for disconnecting said conversion valve mechanism from said booster motor and for admitting air to said conversion valve mechanism to render it operative for effecting energization of said trailer brake motor, and means for subjecting said valve to fluid pressure for shifting it to its second-named position.

11. In a tractor-trailer brake system, a booster mechanism for operating the tractor brakes including a pedal and an air operated booster motor energizable upon operation of the pedal, a trailer brake operating motor, a conversion valve mechanism operable upon the admission of air thereto for connecting said trailer brake motor to a source of pressure differential to operate it, a pair of conduits, one of which has one end connected to said booster motor and the other of which is connected to said conversion valve mechanism for the admission of air thereto, a valve casing having a pair of valve seats therein and connected to the other ends of said conduits, a valve in said casing normally engaging one of said seats and movable to an operative position engaging the other seat to close communication between the first-named conduit and the interior of said valve casing, and means operative upon initial movement of the brake pedal from its "off" position for moving said valve from its normal position to its operative position and for admitting air into said casing through the first-mentioned valve seat, said valve casing communicating with the second-mentioned conduit to admit air thereto when said valve is in its operative position.

12. In a tractor-trailer brake system, a booster mechanism for operating the tractor brakes including a pedal and an air operated booster motor energizable upon operation of the pedal, a trailer brake operating motor, a conversion valve mechanism operable upon the admission of air thereto for connecting said trailer brake motor to a source of pressure differential to operate it, a pair of conduits, one of which has one end connected to said booster motor and the other of which is connected to said conversion valve mechanism for the admission of air thereto, a valve casing having a pair of valve seats therein and connected to the other ends of said conduits, a valve in said casing normally engaging one of said seats and movable to an operative position engaging the other seat to close communication between the first-named conduit and the interior of said valve casing, a chamber communicating with the interior of said valve casing through the first-mentioned valve seat, means for controlling the pressures in said chamber and normally maintaining sub-atmospheric pressure therein, pressure responsive means for effecting operation of said last-named means for admitting air to a predetermined limited pressure into said chamber, said valve being movable by such pressure to its operative position and said valve casing communicating with the second-mentioned conduit to admit air from said chamber into said conversion valve mechanism, through said second mentioned conduit when said valve is in its operative position, and means responsive to initial movement of the brake pedal from its "off" position for rendering said pressure responsive means operative.

13. Apparatus constructed in accordance with claim 12 wherein the means for operating said pressure responsive means comprises a solenoid, and a circuit therefor including a switch movable by the brake pedal upon initial movement thereof from its "off" position.

14. An auxiliary valve mechanism for controlling the conversion valve mechanism of a tractor-trailer booster brake system wherein a conduit is connected between the tractor booster and the conversion valve which controls the trailer brake motors, comprising a housing provided with a pair of spaced diaphragms defining an intermediate chamber therebetween, and upper and lower chambers respectively above the upper diaphragm and below the lower diaphragm, a valve housing arranged in the conduit connecting the tractor booster and the conversion valve, a pair of valve seats in said valve housing, one affording communication therethrough with the tractor booster and the other affording communication between said valve housing and said lower chamber, said valve housing being ported for communication with the portion of the conduit leading to the conversion valve, a valve device in said valve housing movable in either direction therein by differential pressures acting on its ends and having valve elements engageable with the respective valve seats, a normally closed air valve controlling communication between the atmosphere and said lower chamber, said lower diaphragm having an element engageable with said air valve to open it upon downward movement of such diaphragm, means biasing said diaphragms upwardly, and a control device for controlling relative pressures in said upper and intermediate chambers to overcome said biasing means and move said lower diaphragm downwardly whereby said element carried thereby will open said air valve.

15. An auxiliary valve mechanism for controlling the conversion valve mechanism of a tractor-trailer booster brake system wherein a conduit is connected between the tractor booster and the conversion valve which controls the trailer brake motors, comprising a housing provided with a pair of spaced diaphragms defining an intermediate chamber therebetween, and upper and lower chambers respectively above the upper diaphragm and below the lower diaphragm, a valve housing arranged in the conduit connecting the tractor booster and the conversion valve, a pair of valve seats in said valve housing, one affording communication therethrough with the tractor booster and the other affording communication between said valve housing and said lower chamber, said valve housing being ported for communication with the portion of the conduit leading to the conversion valve, a valve device in said valve housing movable in either direction therein by differential pressures acting on its ends and having valve elements engageable with the respective valve seats, a normally closed air valve controlling communication between the atmosphere and said lower chamber, said lower diaphragm having an element engageable with said air valve to open it upon downward movement of such diaphragm, means biasing said diaphragms upwardly, means for connecting said intermediate chamber with a source of sub-atmospheric pressure, valve means normally occupying a position connecting said upper and intermediate chambers to balance pressures therein and movable to a second position to disconnect said upper chamber from said intermediate chamber and connect it to the atmosphere, and a control device operative for moving said valve means to its second position to admit air into said upper chamber to move the upper diaphragm downwardly and effect similar movement of said lower diaphragm through said biasing means to unseat said air valve.

16. A device constructed in accordance with claim 15 wherein said control device comprises a solenoid having an armature connected to said valve means and energizable to move the latter to its second-named position.

17. A device constructed in accordance with claim 15 wherein the element carried by said lower diaphragm and engageable with said air valve comprises a tube normally affording communication between said intermediate and lower chambers to maintain the latter at sub-atmospheric pressure, said tube being engageable with said air valve to close communication through said tubular member and disconnect said intermediate and lower chambers.

18. In a tractor-trailer brake system, a booster mechanism for operating the tractor brakes including a pedal and a booster motor energizable upon operation of the pedal, a motor for operating the trailer brakes, and means for controlling the energization of the trailer-brake motor, said means comprising a mechanism responsive to energization of the booster motor for energizing the trailer-brake motor to a degree proportionate to energization of the booster motor, a second mechanism responsive to initial movement of the brake pedal from its "off" position for effecting energization of said trailer-brake motor wholly independently of operation of said booster motor, and a device connected to said booster motor and subject directly to energization thereof for rendering said second mechanism ineffective for controlling said trailer brake motor upon energization of said booster motor incident to further movement of the brake pedal.

19. In a tractor-trailer brake system, a booster mechanism for operating the tractor brakes including a pedal and a booster motor energizable upon operation of the pedal, a motor for operating the trailer brakes, and means for controlling the energization of said trailer-brake motor, said means comprising a mechanism responsive to energization of the booster motor for energizing the trailer-brake motor to a degree proportionate to energization of said booster motor, a second mechanism for effecting energization of said trailer-brake motor wholly independently of the booster motor and including an electrically-operated device and a circuit therefor comprising a switch movable to closed position upon initial movement of the brake pedal from its "off" position, and a device connected to said booster motor and subject directly to energization thereof for rendering said second mechanism ineffective for controlling said trailer brake motor upon energization of said booster motor incident to further movement of the brake pedal.

20. In a tractor-trailer brake system, a booster mechanism for operating the tractor brakes including a pedal and a booster motor energizable upon operation of the pedal, a motor for operating the trailer brakes, and means for controlling the energization of the trailer-brake motor, said means comprising a mechanism responsive to energization of the booster motor for energizing the trailer-brake motor to a degree proportionate to energization of the booster motor, a second mechanism for effecting energization of said trailer-brake motor independently of operation of the booster motor, and a device connected to said booster motor and subject directly to energization thereof for rendering said second mechanism ineffective for controlling said trailer-brake motor upon energization of said booster motor.

21. In a tractor-trailer brake system, a booster mechanism for operating the tractor brakes including a pedal and a booster motor energizable upon operation of the pedal, a motor for operating the trailer brakes, and means for controlling the energization of said trailer-brake motor, said means comprising a mechanism responsive to energization of the booster motor for energizing the trailer-brake motor to a degree proportionate to energization of said booster motor, a second mechanism for effecting energization of said trailer-brake motor wholly independently of the booster motor and including an electrically operated device and a circuit therefor comprising a manually operable switch, and a device connected to said booster motor and subject directly to energization thereof for rendering said second mechanism ineffective for controlling said trailer-brake motor upon energization of said booster motor.

JEANNOT G. INGRES.

REFERENCES CITED

The following references are of record in the file of this patent:

UNITED STATES PATENTS

| Number | Name | Date |
| --- | --- | --- |
| 1,957,891 | Kazenmaier | May 8, 1934 |
| 2,100,053 | Hill et al | Nov. 23, 1937 |
| 2,169,668 | Thomas | Aug. 15, 1939 |
| 2,182,047 | Eaton | Dec. 5, 1939 |
| 2,185,261 | Leupold | Jan. 2, 1940 |
| 2,275,255 | Freeman | Mar. 3, 1942 |
| 2,366,608 | Freeman | Jan. 2, 1945 |
| 2,429,194 | Price | Oct. 14, 1947 |